Patented May 2, 1933

1,907,231

UNITED STATES PATENT OFFICE

CHARLES ANGOT, OF BEZONS, FRANCE

RUBBERIZED AND FIBROUS PLASTIC MATERIAL UNATTACKABLE BY OIL

No Drawing. Application filed June 6, 1931, Serial No. 542,700, and in Germany June 14, 1930.

The subject of the present invention is a new rubberized and fibrous plastic material unattackable by oil which may be used in many different forms.

The packings of pistons, such as flanges, segments or valve flaps for pumps, presses, screw jacks, or other apparatus operating in oil and the joints of oil pipes have hitherto been formed in leather. This material in spite of its insolubility in oil has several disadvantages, such as the fact that it hardens rapidly when the apparatus operates intermittently or softens and disaggregates in contact with certain oils which impregnate the leather and reduce its strength. It is moreover very difficult to obtain in leather articles of perfectly regular thickness and of smooth and homogeneous surface.

Leather parts wear rapidly, particularly pump flanges, and necessitate frequent expensive replacement, while their renewal is a cause of stoppage or disturbance in the operation of apparatus in which they are fitted.

The subject of the invention is a fibrous rubberized material which does not have the disadvantages of leather, being unattackable by oils, and which may be prepared in a variety of forms, such as moulded articles of various shapes, cords, tapes, plates and sheets adapted for any application.

This material is characterized by the combination of 40 to 50% of caoutchouc with 20 to 40% of filling material, 10 to 20% mineral, vegetable or animal fibers, 2 to 5% animal glue, 1 to 2% glycerine, and 0.5 to 1% of an accelerator, and with a weight of sulphur varying between 5 to 12% of the weight of caoutchouc used.

After vulcanization of the mixture a compressible elastic material is obtained having the tenacity of leather quite unattackable by oils and very durable. By way of example the following formula is given:

Pure rubber _____ 50
Cotton fiber _____ 10
Gelatine _____ 5
Glycerine _____ 1
Carbon black _____ 28
Sulphur _____ 5.5
Diphenylguanidine D. P. G. _____ 0.5
                                      —————
                                      100.0

This material may be moulded, laminated, calendered, extruded, turned or cut out.

Having now particularly described and ascertained the nature of my said invention and in what manner the same is to be performed, I declare that what I claim is:

Oil resisting packing for joints constituted by fibrous plastic materials containing vulcanized rubber as well as fillers and having the following composition: 40 to 50% rubber, 20 to 40% fillers, 10 to 20% fibers, 2 to 5% animal glue, 1 to 2% glycerine, 0.5 to 1% of an accelerator, and sulphur in the proportion of 5 to 12% of the weight of rubber used.

In witness whereof I have hereunto set my hand.

CHARLES ANGOT.